United States Patent [19]

Codding, III et al.

[11] Patent Number: 4,871,197

[45] Date of Patent: Oct. 3, 1989

[54] EARTHQUAKE RESISTANT PIPE JOINTS

[75] Inventors: Charles N. Codding, III, Vestavia Hills; George F. Rhodes, Leeds; Philip I. McGrath, Jr., Birmingham, all of Ala.

[73] Assignee: United States Pipe and Foundry Company, Birmingham, Ala.

[21] Appl. No.: 232,079

[22] Filed: Aug. 15, 1988

[51] Int. Cl.[4] ............................................. F16L 21/02
[52] U.S. Cl. .................................... 285/231; 285/374; 285/223
[58] Field of Search ............... 285/114, 374, 231, 232, 285/233, 234, 223, 224, 399, 382, 226, 229, 235, 236, 237

[56] References Cited

U.S. PATENT DOCUMENTS

| 763,542 | 6/1904 | Crawford et al. | 285/374 |
| 1,342,133 | 6/1920 | Sargent . | |
| 1,759,657 | 5/1930 | Dibner | 285/114 |
| 1,829,236 | 10/1931 | Perkins | 285/374 |
| 2,323,482 | 7/1943 | Merrill | 285/374 |
| 2,431,120 | 11/1947 | Howe | 285/233 |
| 2,953,398 | 9/1960 | Haugen et al. | 285/231 |
| 3,281,166 | 10/1966 | Doughty, Jr. et al. | 285/114 |
| 3,684,320 | 8/1972 | Platzer et al. | 285/374 |
| 3,720,428 | 3/1973 | Zastawny | 285/368 |
| 3,952,526 | 4/1976 | Watkins et al. | 61/46 |
| 4,183,561 | 1/1980 | Miyamoto et al. | 285/321 |
| 4,417,754 | 11/1983 | Yamaji et al. | 285/104 |
| 4,540,204 | 9/1985 | Battle et al. | 285/231 |

Primary Examiner—Randolph A. Reese
Assistant Examiner—Anthony Knight
Attorney, Agent, or Firm—James W. Grace; Charles W. Vanecek

[57] ABSTRACT

In the environment of telescoping pipes, a collapsible member is placed between a fixed weld and a locking segment so that when extraordinary forces are applied which tend to cause the pipes to be pulled apart, the crushing element absorbs the excessive forces and prevents its disengagement.

9 Claims, 2 Drawing Sheets

EARTHQUAKE RESISTANT PIPE JOINTS

BACKGROUND OF THE INVENTION

1. Field of the Invention

This invention is in the field of joining pressure pipe, and more specifically, joining bell and spigot pipe to withstand forces which are suddenly and strongly applied to the pipes.

2. Description of the Prior Art

It is common practice to make pipe joints wherein one pipe having a spigot or plain end is pushed into the bell end of another pipe. To prevent leakage a soft rubber ring with a hard rubber insert on one side is placed into the bell of the outside pipe, prior to the insertion of the spigot end.

To prevent the pipes from separating under pressure such joints have been modified by using tightening bolts, and tightening plates to connect the pipes. However, these plates and bolts have proven to be costly and complicated to use in the field.

A newer method of connecting such pipes is taught by U.S. Pat. No. 3,684,320. In this patent the outer circumference of the plain end of one pipe has a series of supporting elements and the bell end of the other pipe has at least one projection, protruding downwardly towards the inside of the bell. The diameter of the projection is at least equal to the diametric distance between the outer surfaces of the supporting elements so that the plain pipe with its supporting elements can be pushed into the bell end of the other pipe and inwardly beyond the projection. Locking members are inserted between the projection and the supporting elements to lock the pipe together. The locking members are introduced into a recess or recesses in the projection and rotated to engage a portion of the projection and the supporting elements.

In the disclosure of the prior art U.S. Pat. No. 3,684,320 and, in actual practice, the mating surface of the projection and the locking members have the shape of a spherical shell and both spherical shells have the same diameter. In effect, the two surfaces coact in a wedging action so that as the inner and outer pipes are moved apart by the pressure of the internal fluid, the two mating surfaces slide against each other. Since the projection has a slope slanting downwardly in the direction of the open face of the bell and the locking segments have a slope in the same direction, as the pipes tend to move apart, a compressing action takes place between the projection and the locking segment because the locking segment is held tightly against axial movement by the supporting elements.

While the above described joint is prevalent in the market place, there are certain circumstances wherein the joint becomes subject to sudden unexpected forces which tend to destroy the joint. A particular case occurs when a pipe is subjected to sudden earth movement, such as an earthquake. Under these circumstances even the improved joint may prove inadequate.

DESCRIPTION OF THE INVENTION

In order to prevent or inhibit separation of the pipes at the joint, a collapsible member is inserted between one face of the locking segments and the supporting elements which can be a weldment. The weldment surrounds the circumference of the spigot end of one of the pipes. The collapsible member may take the form of a tubular mesh or a metal tube made with a series of radial corrugations or a cage made of spaced rods held in annular end caps. Other forms and shapes for the collapsible member will occur to those skilled in the art. The collapsible member may be designed to have sufficient strength to withstand crushing forces of a predetermined amount can thus be designed to withstand the load resulting from anticipated line pressure and liquid surge pressure but to collapse upon being subjected to loads in excess of these. Such excess loads might, of course, result from earth movement in an earthquake.

SUMMARY OF THE INVENTION

The invention comprises a collapsible member for absorbing suddenly applied forces which would otherwise rupture or destroy a pipe joint. The collapsible member surrounds a portion of the spigot end of one pipe and is placed between a weldment which surrounds the spigot end and the face of a locking segment which acts as a restraining element in preventing separation of the pipes.

One version of the collapsible member can be designed so that it will collapse upon the application of a sudden force tending to destroy the joint such as by a sudden earth movement. An alternate version of the collapsible member may be designed so that it will gradually collapse upon application of a force greater than the ordinarily expected force.

OBJECTS OF THE INVENTION

It is an object of the present invention to provide a novel pipe joint structure which prevents rupture or destruction of a joint under conditions of sudden and unexpected application of a disrupting force.

It is another object of the present invention to provide a novel pipe joint structure which prevents rupture or destruction of a pipe joint by means of a simple addition of a preformed collapsible member.

It is yet another object of the present invention to provide a novel pipe joint structure which is an improvement over the prior art and yet is easily manufactured without a great departure from accepted pipe manufacturing practice.

BRIEF DESCRIPTION OF THE DRAWING

Other objects and advantages of the present invention will become apparent to those skilled in the art from the following detailed description of the invention taken in conjunction with the accompanying drawings in which like elements are represented by like numerals and in which.

DESCRIPTION OF THE PREFERRED EMBODIMENT

Figure 1:
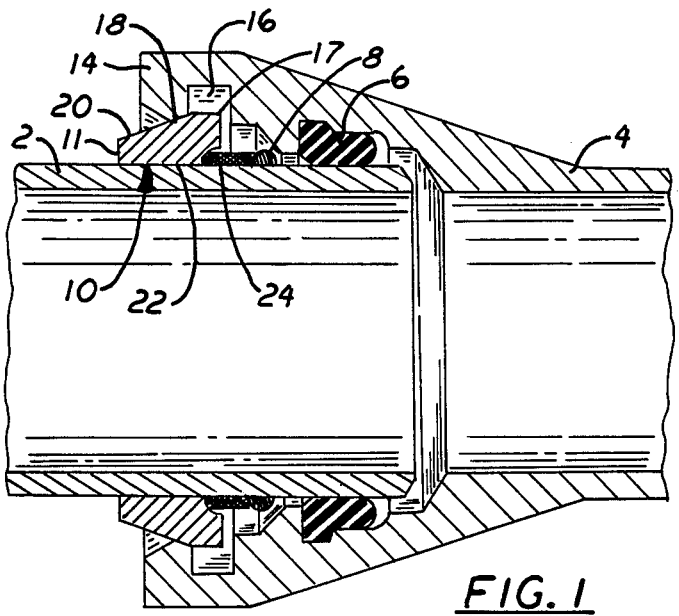
FIG. 1 is a fragmented sectional view of the pipe joint of the invention.

Referring to FIG. 1 of the drawing, there is shown pipe 2 joined to pipe 4 in the novel structure of the invention. Each of pipes 2 and 4 is preferably a ductile pipe made by a centrifugal process, well known in the art, although the invention is not to be limited by the nature of the material of which the pipe is made. The joint between pipes 2 and 4 is sealed by rubber gasket 6 which is compressed between the plain end of pipe 2 and the bell sealing surfaces of pipe 4. A typical joint of this type is illustrated in U.S. Pat. No. 2,953,398, patented Sept. 20, 1960.

In order to provide a locking action to prevent pipes 2 and 4 from separating axially a combination of a supporting element or weldment 8, locking segments 10 and a projection 14 are provided. Projection 14 is integrally cast with the end of the bell of pipe 4 and the depending portion of projection 14 is separated from the major remaining portion of the bell by a groove 16. The lower surface 18 of projection 14 facing toward the interior of the bell of pipe 4 is slanted so that it is in the plane of an acute angle with respect to the longitudinal surface of plain pipe 2. Generally, the lower surface 18 may be considered to be a section of a cone whose apex would be outside the bell of pipe 4. However, surface 18 could be a portion of a sphere whose center would be inside of the bell of pipe 4. Surface 20 will have a similar shape of that of surface 18. As will be discussed in greater detail hereinafter, surfaces 18 and 20 are arranged to abut each other to prevent separation of the pipe joint.

Figure 2:
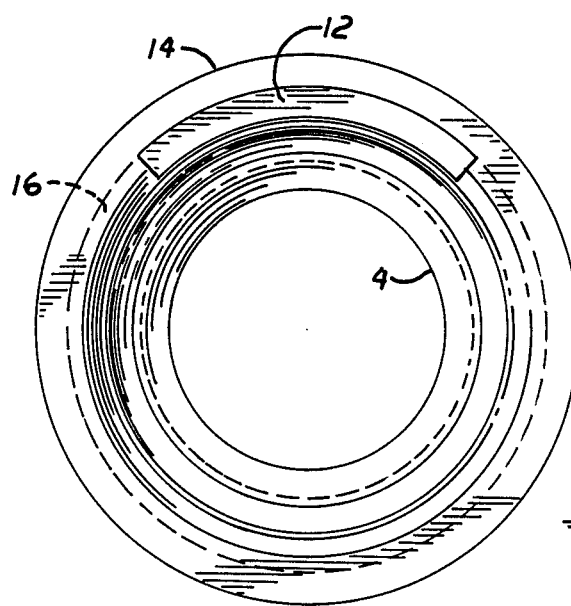
FIG. 2 is an elevational view of the bell of a pipe according to the invention.

FIG. 2 shows an elevation view of the outer face of the bell end and more particularly projection 14 and groove 16, (shown in dotted lines). A recess 12 is cut into projection 14 to permit locking segments 10 to be inserted into groove 16. Recess 12 is longer than a locking segment 10 so that locking segment 10 can be inserted into groove 16 through recess 12.

Figure 3:
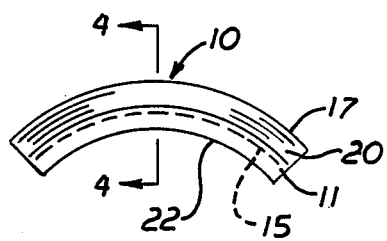
FIG. 3 is a side view of a locking segment according to the invention.
Figure 4:
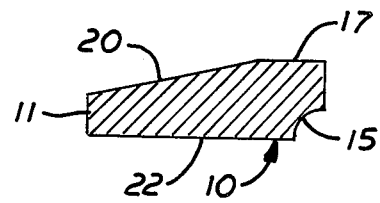
FIG. 4 is a sectional view of a locking segment taken along line 4—4 of FIG. 3.

Locking segments 10 are shown better in FIGS. 3 and 4. In FIG. 3 the locking segment 10 is shown as an arcuate piece, preferably of ductile iron whose shape corresponds to the outer diameter of plain pipe 2. As shown in FIG. 3, locking segment 10 has an under face 22 which is actually an arc corresponding to the outer diameter of plain pipe 2. Locking segment 10 further has a front leg portion 11. Face 17 constitutes the side of locking segment 10 opposite leg portion 11. Slant face 20 connects front leg portion 11 to face 17 which is perpendicular to the under face 22 of locking segment 10. It should be noted that face 20 is designed to have the same slope as lower surface 18 or slightly less slope than surface 18 of projection 14 and when properly installed surface 18 and face 20 will abut and complement each other. In the case where surface 20 has slightly less slope than surface 18, the two surfaces complement each other only after the slope of surface 18 has been decreased due to the wedging action caused by an axial force tending to separate the two pipe. At its lower right hand edge, locking segment 10 has a cut-out portion 15 which is designed to accommodate and mate with weldment 8.

Weldment 8 is a bead welded around the circumference of pipe 2 in a plane inwardly of the end of plain pipe 2. Weldment 8 is located in a plane which is determined by the relative positions and dimensions of projection 14 and locking segment 10. Weldment 8 may also be a bar welded to the plain end of pipe 2.

A typical joint structure of this type is generally shown in U.S. Pat. No. 3,684,320, issued Aug. 15, 1972.

Figure 5:
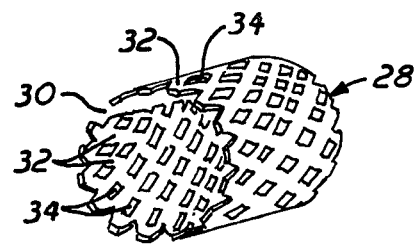
FIG. 5 is a perspective view of a collapsible member of FIG. 1 in greater detail.
Figure 6:
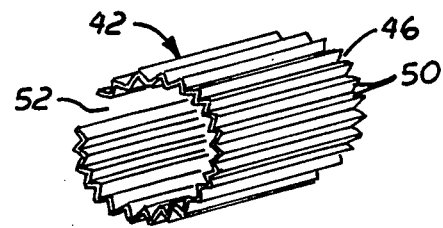
FIG. 6 is a perspective view of an alternative collapsible member of the invention.
Figure 7:
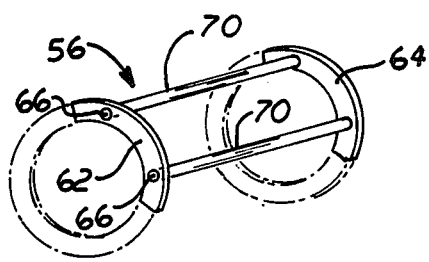
FIG. 7 is a perspective view of a further alternative collapsible member of the invention.

In accordance with the present invention, a collapsible member 24 surrounds that part of the periphery of the spigot end of pipe 2 and lies between cut-out face 15 and weldment 8. If desired, collapsible member 24 may be designed to abut face 17 of body portion 13 of locking segment 10. Reference may be had to FIGS. 5, 6, and 7 for a more detailed description of collapsible element 24.

FIG. 5 illustrates one version of collapsible member 24 and generally consists of a tube 28 made of metal mesh with a slit 30 along its longitudinal axis. The material of tube 28 may be conventional metal mesh made by cutting a flat sheet of metal, such as steel or aluminum in the form of short spaced slits and then causing the slitted material to expand to form an open mesh with metal struts 32 forming the structure of collapsible member 24 with holes 34 between the struts.

The strength of the material of which collapsible member 24 is made can vary depending upon whether it is high strength steel or lighter weight aluminum. The strength of the material is selected in accordance with the nature of the installation. For smaller diameter pipes, such as 4 to 6 inch pipes, the strength of the material to prevent collapse will be less than that required for pipes of larger diameter such as 36 inch pipes or larger. Corrosion resistant material such as stainless steel may be preferred in some installations.

As an alternative structure for collapsible member 24, a tube 42 having an accordion type fold 46 as shown in FIG. 6, may be used. The folds are in the form of corrugations 50 which are axially spaced along the surface of sheet of metal and the sheet is rolled into a tube with the corrugations being parallel to the axis of the tube. The tube may not be fully closed to leave a gap 52 which will facilitate insertion of the tube into the area over the periphery of the spigot of pipe 2 and lying between locking segment 10 and weldment 8. The corrugations may be undulating or have sharp definite edges.

FIG. 7 illustrates an alternative tube 56 which can be used as a collapsible member 24. In this version, a cylinder is made by having annular end plates 62 and 64 having spaced holes 66 through the end plates. A series of rods 70 may be placed through the spaced holes to form a cage-like structure. As an alternative, rods 70 may be welded at spaced intervals to end plates 62 and 64. This type of cage structure is not as flexible as the mesh-type structure of FIG. 5 of the accordion-type structure of FIG. 6. For this reason, it may not be as easy to place cylinder 60 over the spigot end of paper 20 after assembly of pipes 2 and 4. In this case, it is preferably that the cage type collapsible member 24 be assembled over the periphery of the spigot end of pipe 2 before the weldment 8 is welded to the spigot of pipe 2.

In order to assemble the joint between pipes 2 and 4 the gasket 6 is first inserted into its designed groove in the bell end of pipe 4. Plain pipe 2 is pushed into the bell end of pipe 4 until its outer end is pushed beyond gasket 6 to form a fluid tight seal. The outer diameter of weldment 8 is smaller than the open diameter of projection 14 so that weldment 8 clears projection 14 when pipe 2 is inserted into pipe 4. For the collapsible members 24 illustrated in FIGS. 5 and 6 where they have a slit, the collapsible member 24 can be formed into the form of cylinder and pushed axially through the gap between the lower edge of projection 14 and the outer circumference of the spigot end of pipe 2. For the collapsible member 24 shown in FIG. 7, it will be preferably to put the cage type collapsible member over the spigot end of pipe 2 before weldment 8 is welded in place. In either case, one end of collapsible member 24 is placed near weldment 8. Locking segments 10 are inserted into groove 16 by putting them through recess 12 in the face of the bell of pipe 4 and then rotating them so that they form a ring around the outer surface of plain pipe 2. Weldment 8 acts as a stop to keep locking segments 10 in groove 16 by pressing against collapsible member 24.

As the fluid pressure increases the pipes 2 and 4 may tend to disengage because the axial load tends to separate the two pipes but locking segments 10 will abut against one end of collapsible member 24 and the other end of collapsible member 24 will abut against weldment 8 and surface 18 of projection 14 will engage surface 20 of locking segment 10. The two surfaces 18 and 20 will fit tightly together in a wedging action as the pressure of the fluid in its pipe increases. This action continues in accordance with the teachings of U.S. Pat. No. 3,684,320. The strength of collapsible member 24 is usually designed to be enough so that it does not collapse under the design pressure of the joint but will collapse upon the occurrence of a sudden, unexpected applied force.

However, if an unexpected force such as that caused by earth movement occurs, the pipes 2 and 4 may tend to move apart abruptly and cause rupture of the joint. In the present invention, collapsible member 24 will absorb the sudden force and by collapsing will alleviate the tendency of this joint to rupture.

Figure 8:
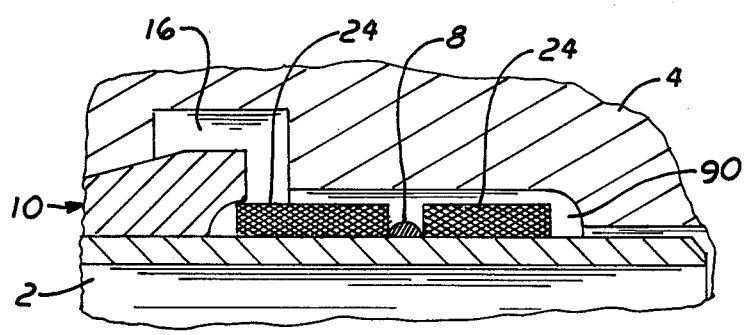
FIG. 8 is a fragmented sectional view of an alternative pipe joint of the invention.

The invention has been described with the collapsible member being placed between the weldment 8 and the locking segment 10. In this structure, the joint is designed to prevent rupture by forces which cause the pipes 2 and 4 to be pulled apart. FIG. 8 shows an alternative structure wherein a collapsible member 24 may be placed also between the weld and the open end of the spigot. In this case, the left-hand end of collapsible member abuts weldment 8 while the right-hand end abuts an inwardly radially extending projection 90 of the bell end of pipe 4. This alternative structure will prevent compressive forces from disrupting the joint. The collapsible member 24 can be placed over the spigot end of pipe 2 before insertion of pipe 2 into the bell of pipe 4.

The present embodiments of this invention are illustrative and should not be considered as restrictive, the scope of the invention being indicated by the appended claims.

We claim:

1. In combination a first pipe in locking, overlapping engagement with a second pipe and means to lock the two pipes together, said means comprising:
    a. said first pipe having a bell portion, said bell portion having a radially, inwardly, circumferentially extending projection integrally mounted to said bell portion at one end of said first pipe, said projection forming one end of a circumferential groove, said projection having a surface remote from said bell portion facing toward the interior of said first pipe and forming a contacting surface, said projection further having at least one recess connecting to said circumferential groove;
    b. a plurality of arcuate shaped locking segments corresponding in shape to said circumferential groove and conforming to the outer circumference of said second pipe, each of said segments having a leg portion; said leg portion having a contacting surface,
    c. said second pipe having a spigot end and a circumferential weldment protruding radially from its outside surface near the spigot end, and
    d. a collapsible, metallic member encircling said spigot end and abutting said weldment in a direction away from the open end of said spigot end, and abutting said locking segments,
    e. said locking segments being installed through said recess and into slidable engagement with the outside surface of the plain end of said second pipe between said collapsible member and said projection and thereafter moved out of alignment with said recess, after said contacting surface of said leg portions abut with said contacting surface of said projection.

2. The combination of claim 1, wherein said first contacting surface of said projection is frusto-conically shaped and said contacting surface of said leg portion of said locking segment is frusto-conically shaped to abut with said first contacting surface of said projection.

3. The combination of claim 1 wherein said first contacting portion of said projection is concave spherically shaped and said contacting surface of said leg portion of said locking segment is convex spherically shaped.

4. In combination with a first pipe in locking, overlapping engagement with a second pipe and means to lock the two pipes together, said means comprising:
    a. said first pipe having a bell portion, said bell portion having a radially, inwardly, circumferentially extending projection integrally mounted to said bell portion at one end of said first pipe, said projection forming one end of a circumferential groove, said projection having a surface remote from said bell portion facing toward the interior of said first pipe and forming a contacting surface, said projection further having at least one recess connecting to said circumferential groove;
    b. a plurality of arcuate shaped locking segments corresponding in shape to said circumferential groove and conforming to the outer circumference of said second pipe, each of said segments having a leg portion; said leg portion having a contacting surface,
    c. said second pipe having a spigot end and a circumferential weldment protruding radially from its outside surface near the spigot end, and
    d. a collapsible, metallic member encircling said spigot end and abutting said weldment in a direction away from the open end of said spigot end, and abutting said locking segments,
    e. said locking segments being installed through said recess and into slidable engagement with the outside surface of the plain end of said second pipe between said collapsible member and said projection and thereafter moved out of alignment with said recess, after said contacting surface of said leg portions abut with said contacting surface of said projection,
    f. said collapsible, metallic member comprising a tubular mesh having interconnecting struts spaced from each other.

5. The combination of claim 4 in which said tubular mesh has an axial extending throughout its length to form a longitudinal gap in the periphery of said tubular mesh.

6. The combination of claim 1 in which said collapsible member comprises a tubular member having longitudinal folds around its periphery.

7. The combination of claim 6 in which said tubular member has an axial slot extending throughout its length to form a longitudinal gap in the periphery of said tubular member.

8. The combination of claim 1 in which said collapsible member comprises a cage having annular end plates spaced by integrally mounted rods.

9. The combination of claim 1 in which a second collapsible member is inserted between said weldment and the open end of said spigot end of said second pipe.

* * * * *